US012591715B2

(12) United States Patent
Peng et al.

(10) Patent No.: US 12,591,715 B2
(45) Date of Patent: *Mar. 31, 2026

(54) SECURE COPROCESSOR ENFORCED SYSTEM FIRMWARE FEATURE ENABLEMENT

(71) Applicant: Advanced Micro Devices, Inc., Santa Clara, CA (US)

(72) Inventors: Tan Peng, Santa Clara, CA (US); Scott Swanstrom, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 696 days.

This patent is subject to a terminal disclaimer.

(21) Appl. No.: 17/546,577

(22) Filed: Dec. 9, 2021

(65) Prior Publication Data

US 2022/0237333 A1 Jul. 28, 2022

Related U.S. Application Data

(60) Provisional application No. 63/142,467, filed on Jan. 27, 2021.

(51) Int. Cl.
| | |
|---|---|
| *G06F 21/76* | (2013.01) |
| *G06F 21/33* | (2013.01) |
| *G06F 21/55* | (2013.01) |
| *G06F 21/57* | (2013.01) |
| *G06F 21/60* | (2013.01) |
| *G06F 21/62* | (2013.01) |
| *G06F 21/10* | (2013.01) |

(52) U.S. Cl.
CPC .............. *G06F 21/76* (2013.01); *G06F 21/33* (2013.01); *G06F 21/552* (2013.01); *G06F 21/554* (2013.01); *G06F 21/572* (2013.01); *G06F 21/602* (2013.01); *G06F 21/6209* (2013.01); *G06F 21/107* (2023.08)

(58) Field of Classification Search
CPC ........ G06F 21/76; G06F 21/33; G06F 21/552; G06F 21/554; G06F 21/572; G06F 21/602; G06F 21/6209; G06F 21/107
See application file for complete search history.

(56) References Cited

U.S. PATENT DOCUMENTS

| | | | |
|---|---|---|---|
| 8,966,657 B2 | 2/2015 | Martinez et al. | |
| 11,080,387 B1 * | 8/2021 | Lattin ................... | G06F 21/121 |
| 2009/0055695 A1 * | 2/2009 | Maddali ............ | G01R 31/3187 |
| | | | 714/724 |
| 2016/0191253 A1 * | 6/2016 | Pyle .................... | H04L 63/0823 |
| | | | 380/28 |
| 2017/0003956 A1 * | 1/2017 | Chang .................... | G06F 8/658 |
| | | | 717/170 |

(Continued)

OTHER PUBLICATIONS

Wikipedia. "Public Key Certificate" 2020. <https://en.wikipedia.org.wiki/Public_key_certificate>, 11 pages.
(Continued)

*Primary Examiner* — Ayoub Alata

(57) ABSTRACT
A method includes performing a validation process on a firmware feature description file indicating a set of firmware features in an integrated circuit package, and communicating a result of the validation process to firmware feature enablement logic residing in the integrated circuit package.

20 Claims, 7 Drawing Sheets

(56)        References Cited

U.S. PATENT DOCUMENTS

2019/0073212  A1*    3/2019   Ishimoto ................. G06F 9/542
2021/0288821  A1     9/2021   Young et al.
2022/0207125  A1     6/2022   Young et al.

OTHER PUBLICATIONS

Office Action issued in U.S. Appl. No. 17/531,735, mailed Aug. 1,
2024, 16 pages.
Final Office Action mailed Jan. 30, 2025 for U.S. Appl. No.
17/531,735, 15 pages.
Non-Final Office Action mailed Jun. 18, 2025 for U.S. Appl. No.
17/531,735, 7 pages.

* cited by examiner computing device 100 display 105 processing unit(s) 104 peripheral device(s) 108 network adapter 107 bus 101 input device (keyboard, touch screen, etc.) 102 memory 106 instructions 106a firmware feature description (FFD) file 202 encoded firmware feature set 301 signature (by customer's private key) 302 key certificate 203 customer's vendor ID 311 customer's public key 312 signature (by manufacturer's private key) 313

FIGURE 3

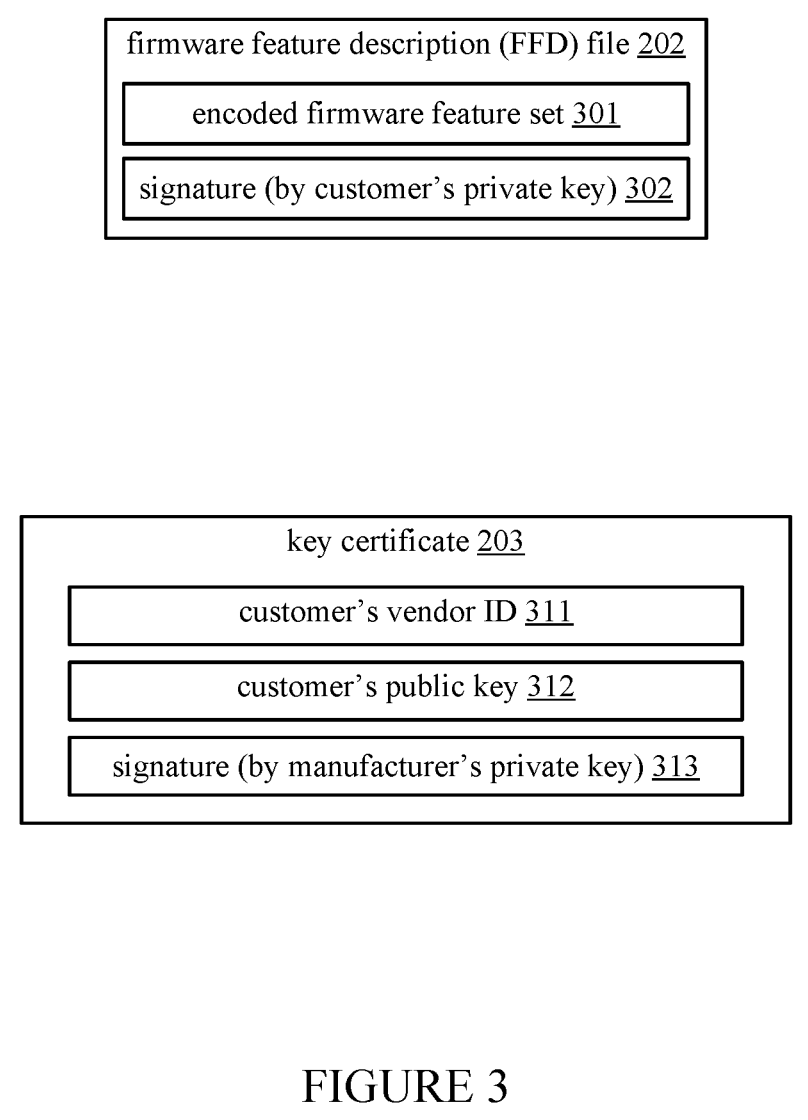

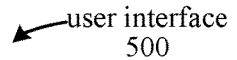

user interface
500

System Firmware Feature Sets

Choose features:

Commercial Firmware Features Sets

☐ Secure-Core PC DRTM

☐ FIPS Certification Mode Enablement

☐ FAR (Firmware Anti-Rollback)

☐ TSME(Transparent Memory Encryption)

☐ Wireless Manageability

Platform Security Features Sets

☐ Rom Armor Client Version

☐ PSP RPMC(Reply-Protection Monotonic Counter)

☐ PSP APCB(AGESA Programmable Configuration Block)Signing

Platform System Management Unit(SMU) Features Sets

☐ Enable Advanced Power Saving Modes (Z9/Z10)

☐ Higher DPM for MPx Cores

Value-Add Features

☐ Platform Secure Boot Enablement and Fusing

☐ System SPI-ROM Characteristic Configuration

System Debuggability Features Sets

☐ PSP Assisted Debug (PAD)

☐ MPx Cores debug log output

☐ Uncheck all

Submit

FIGURE 5

SECURE COPROCESSOR ENFORCED SYSTEM FIRMWARE FEATURE ENABLEMENT

CROSS REFERENCE TO RELATED APPLICATIONS

This application claims priority to U.S. Provisional Application No. 63/142,467, filed on Jan. 27, 2021, which is incorporated by reference herein in its entirety.

BACKGROUND

A system on a chip (SoC) is an integrated circuit device that integrates all or most electronic circuit components of a computer system in a single device package. These components can include one or more processing units, different types of memory devices, communication ports, and other devices. In a SoC, these components are typically integrated on a single integrated circuit die, instead of being implemented as discrete modules or expansion cards connected together on a circuit board (e.g., a motherboard). Accordingly, a SoC part can be referenced using a single stock-keeping unit (SKU) or part number.

Presently, a SoC manufacturer may sell SoC parts to original equipment manufacturer (OEM) or original design manufacturer (ODM) customers, who purchase the SoC hardware with a predetermined set of system firmware features. All of the system firmware features are made available to the customer purchasing the SoC, and the customer pays the full price of the SoC device, even if some of the system firmware features will not be used. Creating differentiated SoC devices having different sets of firmware features for different customers' applications is costly, and it may still be impractical to implement every combination of firmware features that a potential customer could request. Additional costs will also be incurred as a result of maintaining additional part numbers for tracking the different SoC devices.

BRIEF DESCRIPTION OF THE DRAWINGS

The present disclosure is illustrated by way of example, and not by way of limitation, in the figures of the accompanying drawings.

FIG. 3 illustrates a firmware feature description file and a key certificate, according to an embodiment.

FIG. 5 illustrates a user interface for selecting one or more system firmware feature sets for enabling, according to an implementation.

DETAILED DESCRIPTION

Figure 1:
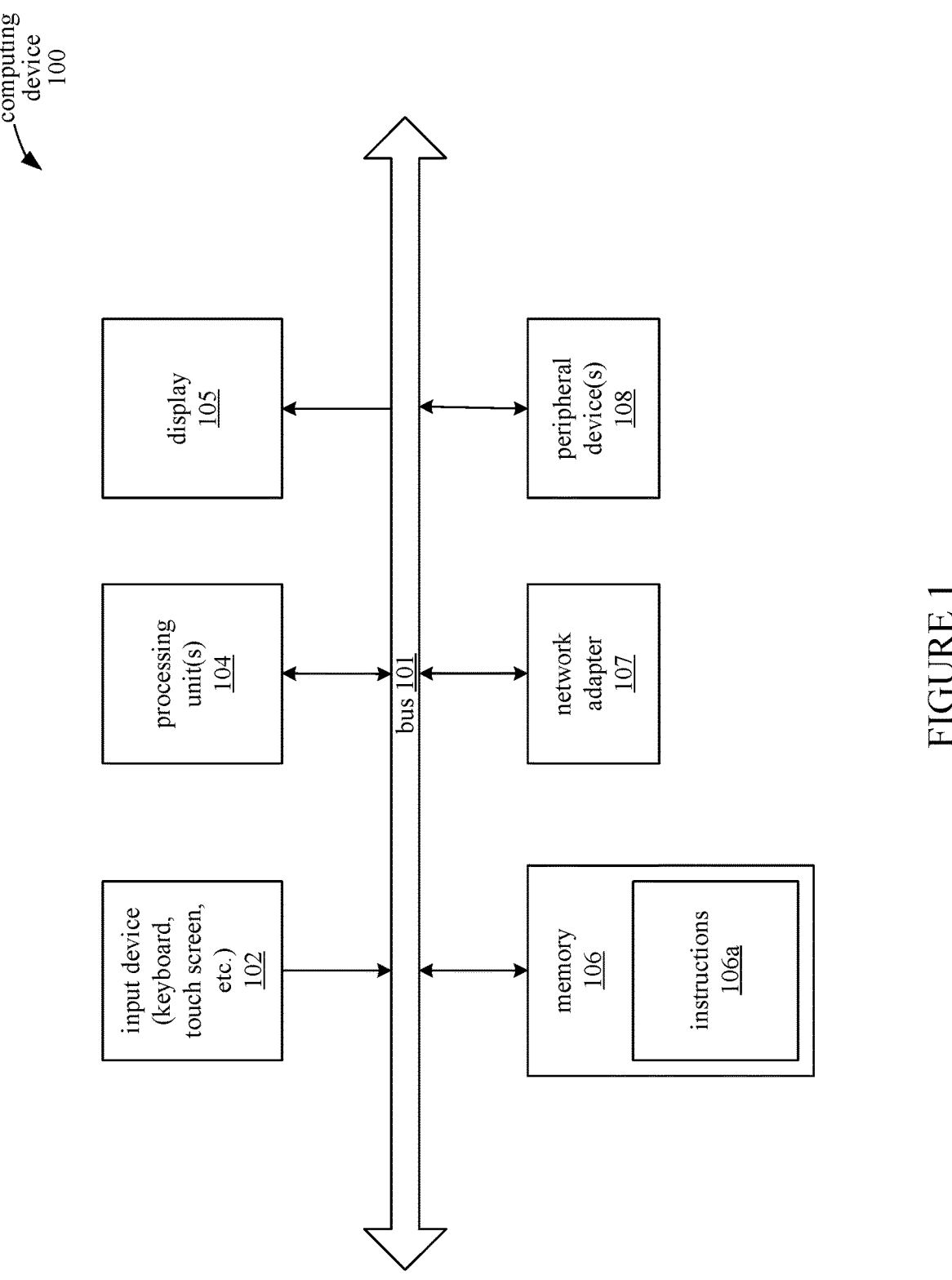
FIG. 1 illustrates an embodiment of a computing device that supports a secure system firmware feature set enablement process.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

In the following description, customers of SoC hardware can be vendors that design and/or sell products that include the SoC hardware, such as original equipment manufacturers (OEMs), original design manufacturers (ODMs), or they can be other end users or purchasers of the SoC hardware. SoC manufacturer refers to a silicon design company, silicon manufacturers, and/or other entity providing the SoC hardware or services related to the operation of the SoC hardware to the SoC customers. Traditionally, customers purchase SoC hardware from the SoC manufacturer along with all of the SoC hardware's associated system firmware features, whether or not the features will be used in the customer's application.

Since it is difficult to predict how an end user is going to use the SoC, the full price of the SoC and its associated system firmware features are charged upfront as the initial cost of purchasing the SoC hardware. This approach lacks the flexibility of the pay-for-use and pay-for-feature approaches for enabling system firmware features, and may result in users paying for features they do not use. This also makes it less economical for the same SoC SKU to be used for multiple different applications where each application utilizes a different set of system firmware features.

In one embodiment, a SoC device supports secure, reliable, and low-cost selection and enablement of different system firmware feature sets per SoC device by using a secure coprocessor in the SoC to enforce and authenticate feature set selections. The ability to select and enable different sets of system firmware feature sets (SFFS) for a single type of SoC device (i.e., that can be tracked using a single SKU or orderable part number) enables a high level of customization and differentiation for targeting the varying demands of diverse applications.

In one embodiment, the available system firmware feature sets that can be enabled include, for example, features for controlling power consumption (e.g., enabling additional power saving modes), security functions, logging functions, and features that otherwise modify the operation of the SoC device. In some embodiments, enabling these feature sets enables operation of hardware circuits and/or software already existing in the SoC device. The secure coprocessor enforced system firmware feature enablement mechanism described herein enables pay-for-use and pay-for-feature approaches to SFFS enablement, provides differentiation of SoC devices with the same SKU or part number, and allows a monitoring party to receive information from the SoC and to control the SoC after the SFFSs have been enabled.

For SoC devices implementing the SFFS enablement mechanism, the full price of the SoC does not need to be charged upfront when the SoC device is purchased. In one embodiment, the SoC initially boots with different levels of SFFSs enabled, thus rendering costs at different ranges depending on the SFFSs that are initially enabled. Later, additional SFFSs can be enabled by updating an associated Firmware Feature Description (FFD) file to indicate the additional features to enable and digitally sign the FFD file.

The added features are enabled by the secure coprocessor after successful validation and authentication of the FFD file, triggered by a system reset. This enables the flexible pricing strategies of the pay-for-use and pay-for-feature approaches.

Accordingly, users of the SoC are also able to differentiate their purchased SoC devices by selecting, customizing, and confirming (through digital signing), and enabling the system firmware feature sets which are suitable for their products. The ability to differentiate SoC devices having the same SKU or orderable part number also reduces costs, since fewer SKU or part numbers need to be maintained and tracked.

In one embodiment, one or more parties monitoring the use of the SoC are able to detect which system firmware features are enabled or disabled during boot time and run time. This enables a monitoring party to choose and effect appropriate countermeasures in response to detecting that certain key system firmware features are disabled by the SoC user, or in response to attempts to enable unapproved features by circumventing the validation and authentication process. These countermeasures include, but are not limited to, central processing unit (CPU) frequency throttling, CPU down-core (i.e., disabling one or more CPU cores), CPU down-cache (e.g. disabling the CPU level 3 cache), and/or other measures which can be carried out by the secure coprocessor. In one embodiment, countermeasures are chosen based on a security policy for each SoC user entity as denoted by an entity ID. In one embodiment, the enablement of appropriate countermeasures is done by the secure coprocessor within the CPU or an Accelerated Processing Unit (APU) in the SoC device.

In one embodiment, the components for performing the SFFS enablement process, monitoring of SFFS usage, countermeasures, etc. reside within a single integrated circuit package, and in some embodiments, all the components reside on a single integrated circuit substrate. Accordingly, the communication channels between the components performing these tasks, in which sensitive information is exchanged, are not exposed outside the integrated circuit package. This prevents external attacks (e.g., bus sniffing, bus alternation, replay attacks, etc.) from being carried out that could otherwise be used to circumvent the SFFS enablement process. In addition, the components residing in the same integrated circuit package or chip do not need to negotiate and exchange security keys in order to establish secure channels for communicating sensitive information used to perform their respective functions, and therefore are not vulnerable to man-in-the-middle attacks or other attacks that target these protocols.

FIG. 1 illustrates an embodiment of a computing device 100 in which the SFFS enablement mechanism is implemented. In general, the computing device 100 represents a product or design that includes a SoC device that utilizes the SFFS enablement mechanism, and is embodied as any of a number of different types of devices, including but not limited to a laptop or desktop computer, mobile phone, server, etc. The computing device 100 includes a number of components 102-108 that can communicate with each other through a bus 101. In computing device 100, each of the components 102-108 is capable of communicating with any of the other components 102-108 either directly through the bus 101, or via one or more of the other components 102-108. The components 101-108 in computing device 100 are contained within a single physical casing, such as a laptop or desktop chassis, or a mobile phone casing. In alternative implementations, some of the components of computing device 100 are embodied as peripheral devices such that the entire computing device 100 does not reside within a single physical casing. In one embodiment, at least some of the components (e.g., processing unit(s) 104, memory 106, network adapter 107, one or more of the peripheral devices 108) in the computing device 100 are implemented in a SoC device.

The computing device 100 also includes user interface devices for receiving information from or providing information to a user. Specifically, the computing device 100 includes an input device 102, such as a keyboard, mouse, touch-screen, or other device for receiving information from the user. The computing device 100 displays information to the user via a display 105, such as a monitor, light-emitting diode (LED) display, liquid crystal display, or other output device.

Computing device 100 additionally includes a network adapter 107 for transmitting and receiving data over a wired or wireless network. Computing device 100 also includes one or more peripheral devices 108. The peripheral devices 108 include mass storage devices, location detection devices, sensors, input devices, or other types of devices that can be used by the computing device 100.

Computing device 100 includes one or more processing unit(s) 104 that receive and execute instructions 106a that are stored in the main memory 106. As referenced herein, each of the processing unit(s) 104 represents a processor "pipeline", and could include central processing unit (CPU) pipelines, graphics processing unit (GPU) pipelines, or other computing engines that support memory operations that use virtual addresses. Main memory 106 is part of a memory subsystem of the computing device 100 that includes memory devices used by the computing device 100, such as random-access memory (RAM) modules, read-only memory (ROM) modules, hard disks, and other non-transitory computer-readable media.

In addition to the main memory 106, the memory subsystem also includes cache memories, such as level 2 (L2) or level 3 (L3) caches, and/or registers. Such cache memory and registers are present in the processing unit(s) 104 or on other components of the computing device 100.

Figure 2:
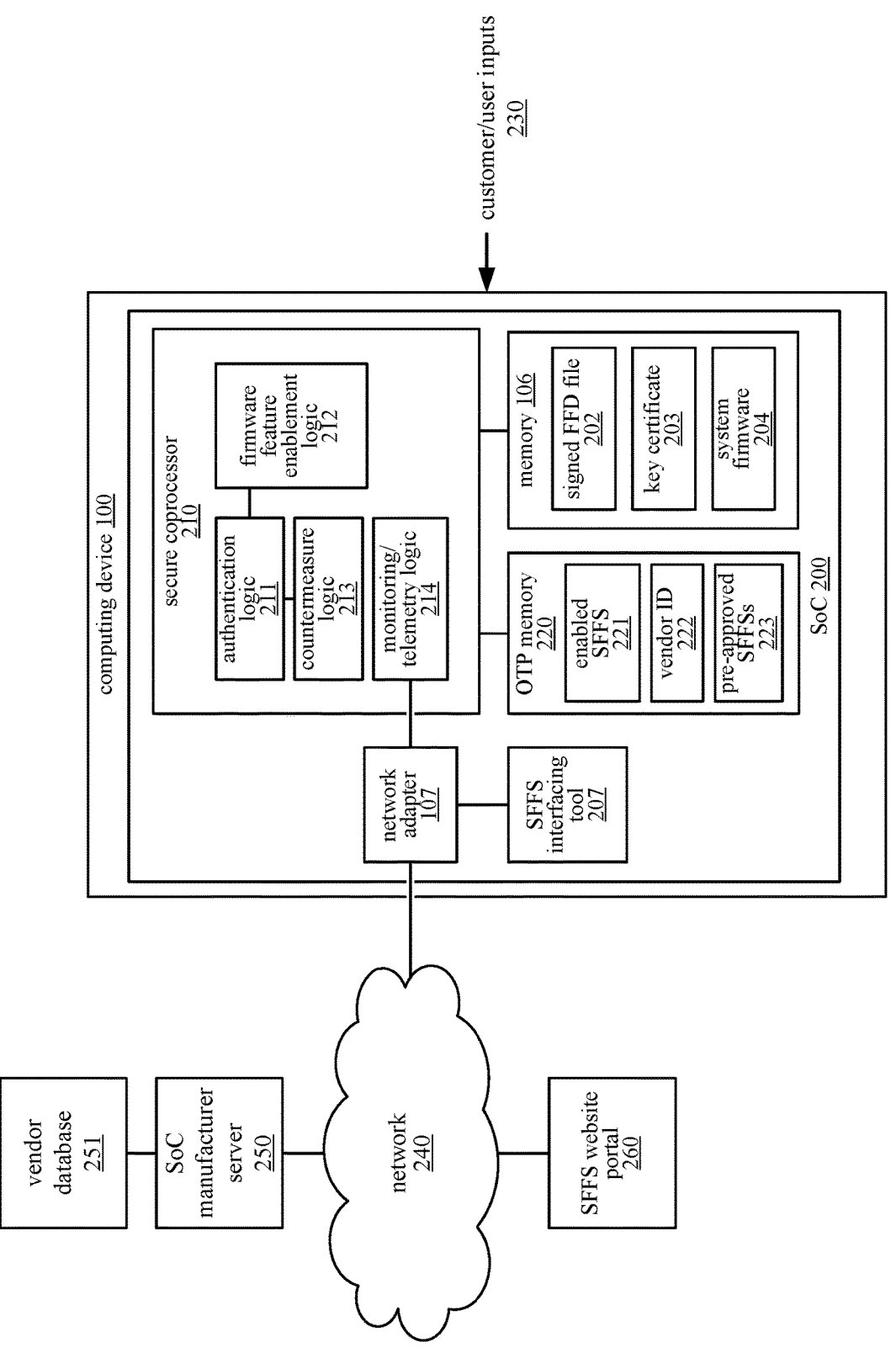
FIG. 2 illustrates devices participating in a process for securely enabling system firmware feature sets in a computing device, according to an embodiment.

FIG. 2 illustrates an embodiment of a computing device 100 in which the SFFS enablement mechanism is implemented. The computing device 100 includes a SoC 200 that supports multiple firmware feature sets that can be enabled by the mechanism. The SoC 200 implements many of the components (e.g., processing unit(s) 104, memory 106, network adapter 107) of the computing system 100 in a single integrated circuit chip. The components illustrated in FIG. 2 are implemented using hardware circuit modules, or a combination of hardware and software and/or firmware.

The computing device 100 is connected to a network 240 (e.g., a wide area network, such as the Internet, or a private network) via its network adapter 107, and communicates with other devices connected to the network 240. As shown in FIG. 2, a server device 250 operated by a monitoring party (e.g., the SoC manufacturer, a vendor, etc.) and a SFFS website portal 260 are accessible via the network 240; thus, the computing device 100 can communicate with these devices 250 and 260 over the network 240.

In one embodiment, the server device 250 performs a number of functions to facilitate the secure enablement of SFFSs in the SoC 200, including adding a new user entity (e.g., a customer, vendor, OEM, ODM, etc.), key certificate generation, firmware feature set selection and firmware feature description (FFD) file generation, etc. The setup process assigns an entity identifier (ID) with user entity that has purchased, will be using the SoC 200, or will be providing the SoC 200 to another user. The setup process is initiated when the user entity (e.g., a company, organization, individual, etc.) requests to be assigned a new entity ID. In one embodiment, the request is initiated based on inputs 230 provided to the computing device 100 by an individual or an automated process on behalf of the user entity. In alternative embodiments, the inputs may be provided via a computing device other than computing device 100. That is, the device used to initiate the new user entity setup process need not contain the SoC 200. The request includes information uniquely identifying the entity to which the entity ID will be assigned.

Upon receiving the request, the monitoring server 250 uses the provided information to perform a lookup of the user entity in the entity database 251. If an entity ID is already assigned to the entity in the database 251, then the server 250 returns the existing entity ID to the computing device 100 or other device that was used to send the request. If the entity is not already assigned to an entity ID, then the server 250 generates a new entity ID and assigns it to the entity by recording the entity's information with the entity ID in the entity database 251.

The server 250 also responds to certificate signing requests (CSRs) received from the user entity via network 240. The user entity transmits a CSR from the computing device 100 (or another computing device) that includes the entity's public key and entity ID. Upon receiving the CSR, the server 250 responds by signing the public key using a root key associated with the SoC device 200 in order to generate a key certificate. The server 250 transmits the generated key certificate to the requesting device (e.g., computing device 100). The key certificate associates the public key of the entity with the entity's entity ID, and is used to secure the process of enabling SFFSs in the SoC 200.

Also used when enabling SFFSs in the SoC is the firmware feature description (FFD) file, which indicates the system firmware features that are to be enabled in the SoC. According to an embodiment, the FFD file is generated by a SFFS website portal 260. The website portal 260 provides an interface where a user entity is able to select the firmware feature sets to be enabled. Then, the portal 260 generates a FFD file indicating the selection in a format that can be used in the secure enablement process. In alternative embodiments, the FFD file is generated by a software, firmware and/or hardware interfacing tool 207 that is executed locally in the computing device 100. For example, the interfacing tool 207 is located in the same integrated circuit package as the other components in SoC 200 as illustrated in FIG. 2.

When the SoC 200 is operational (e.g., after the SFFSs have been selected and successfully enabled), the server 250 additionally receives operational data transmitted from the SoC 200. The operational data includes information recorded during operation of the SoC 200 indicating which features have been enabled, which features are being used, and/or other information pertaining to the operation of the SoC 200.

In various embodiments, components of the SoC 200 can be implemented in SoC hardware, software, or a combination of hardware and software. The system firmware 204 is stored in memory 106 of the SoC device 200. While illustrated as a single block, the memory 106 can represent one or multiple memory devices in the SoC 200 having different capacities and latencies, and/or implemented using different memory technologies. In one embodiment, the system firmware 204 is stored in a nonvolatile region of the SoC memory 106.

Feature sets of the system firmware 204 are enabled by a secure process conducted by the secure coprocessor 210, which operates in parallel with the main processing cores (e.g., processing unit(s) 104) of the SoC device 200. The coprocessor 210 includes components for performing secure SFFS enablement, monitoring of SoC 200 operation and telemetry, and effecting countermeasures, contained within a single integrated circuit package. In some embodiments, these components all reside on a common integrated circuit substrate.

The coprocessor 210 includes authentication logic circuitry 211 for performing authentication tasks when validating a request to enable a selected SFFS. The validation process includes cryptographic authentication of the SFFS that is requested for enabling. A SoC user (e.g., acting on behalf of a user entity) requests enablement of a set of selected firmware features by storing the FFD file 202 signed by the user entity's private key and a key certificate 203 associating the user entity's public key with its entity ID in the memory 106, and then rebooting the device 100. Then, the SFFS enablement process is initiated by the coprocessor 210 when the FFD file 202 and key certificate 203 are detected in the memory 106 at boot time. The authentication logic 211 authenticates the FFD file 202 using the key certificate 203, which proves an association between the user entity's entity ID and the FFD file 202. This indicates that the particular user entity, rather than another party, has selected the features requested by the FFD file 202. The authentication logic 211 detects a violation when there is a mismatch between the public key and the FFD file 202 (i.e., the public key does not match the private key used to sign the FFD file 202).

The firmware feature enablement logic 212 receives an indication from the authentication logic 211 that the FFD file 202 has been successfully validated and authenticated and responds by enabling the selected SFFS, as indicated in the FFD file 202. The coprocessor 210 also binds the enabled SFFS 221 and entity ID 222 to the SoC device 200 by programming the one-time programmable memory 220 (e.g., programmable fuses) in the SoC device 200. The feature set selection is thus tied to the SoC 200 hardware, and there is a maximum number of times the selected SFFS can be changed, depending on the space available for storing the enabled SFFS 221 entries in the OTP memory 220. The recording of the enabled SFFS 221 allows the secure coprocessor 210 to detect if a different feature set is copied from another SoC device to the SoC 200 in an attempt to circumvent the secure feature selection process. Upon detecting that the enabled SFFS 221 does not match, the coprocessor 210 detects a violation and enables the appropriate countermeasures.

The OTP memory 220 additionally stores one or more pre-approved SFFSs 223. In one embodiment, the pre-approved SFFS is determined specifically for each user entity, and is recorded in the OTP memory 220 (e.g., prior to delivery of the SoC 200 to the user entity). The pre-approved SFFS 223 serves as a baseline system firmware feature set in case the SoC user does not select and enable its own set of system firmware features. By default, the pre-approved SFFS 223 is enabled when the SoC 200 is first powered on. The pre-approved SFFS 223 is also used if the user attempts to enable a different SFFS but misconfigures the FFD file, or otherwise fails the secure enablement process. In one embodiment, the pre-approved SFFS 223 indicates the maximum set of firmware features that are available for enabling, which may include fewer than all of the system firmware features supported by the SoC 200 hardware. In this case, the secure SFFS enablement process does not enables firmware features outside the pre-approved set 223.

The secure SFFS enablement process ensures that only SFFS selections that are validly selected are enabled in the SoC 200 system firmware 204. Thus, the authentication logic 211 also detects when attempts are made to circumvent the secure SFFS enablement process. The authentication logic 211 detects a violation when an attempt to enable a SFFS has failed (e.g., due to failed authentication of the FFD file, a mismatch between the entity ID 222 and the entity ID in the key certificate 203, etc.) from an attempt to circumvent the secure enablement process, unintentional misconfiguration, etc. The authentication logic 211 transmits an indication of the violation to the countermeasure logic circuitry 213 in the secure coprocessor 210, which responds by enabling appropriate countermeasures.

In one embodiment, these countermeasures limit the performance or functionality of the SoC device 200, or transmit information to one or more monitoring parties. For example, the countermeasures can include disabling a cache device (e.g., a level 3 cache) in the SoC 200, disabling one or more processing cores, limiting a clock frequency of one or more processing cores, transmitting an indication of the violation to a remote server, such as server 250, etc. Information transmitted to the server 250 includes information identifying the cause of the violation, the user's entity ID and model identifier of the SoC 200, a timestamp, a copy of the FFD file or other indication of the SFFS that was selected for enabling, an indication of which countermeasures were enabled, and/or other information pertaining to the violation. The monitoring party can then use the information to assist the user in remedying the violation.

The coprocessor 210 includes monitoring and telemetry logic circuitry 214 that monitors operation of the SoC 200 and facilitates communication between the secure coprocessor 210 and the monitoring server 250. After the enabling of the requested set of firmware features, the monitoring and telemetry logic 214 records operational data from the SoC 200 device, then transmits the operational data to the monitoring server 250. The operational data includes information about which system firmware features have been enabled and whether the features are being used.

As illustrated in FIG. 2, the components within the SoC 200 reside within a single integrated circuit package. In one embodiment, all of the components in the SoC 200 reside on the same single integrated circuit substrate; alternatively, some of the components may reside on separate substrates that are connected via communication channels (e.g., buses, interconnect fabric, etc.) within the integrated circuit package. The communication channels can be implemented using connection technologies such as, for example, high speed fourth generation Peripheral Component Interconnect Express (PCIe), cross-die or cross-core link, etc. The physical communication channels between components in the SoC 200 are thus concealed within the integrated circuit package, preventing external attacks (e.g., bus sniffing, bus alternation, replay attacks, etc.) that could otherwise be used to circumvent the secure firmware feature set enablement process.

In addition, the components residing in the same integrated circuit package or chip means that security key negotiation and exchange protocols (e.g., Diffie-Hellman) are not needed for establishing communication between these components. Since such security protocols may be vulnerable to man-in-the-middle or other types of attacks, having the components conducting the secure firmware feature enablement process (system firmware features enablement, control, monitoring, telemetry, and countermeasures) in a single SoC 200 by using the secure coprocessor 210 built into the SoC 200 also prevents these types of attacks. The size of the SoC 200 die is also reduced by integrating the components 211-214 in the secure coprocessor 210, the OTP memory 220, memory 106, SFFS interfacing tool 207, etc. in the same integrated circuit package.

FIG. 3 illustrates embodiments of a firmware feature description (FFD) file 202 and a key certificate 203 that are used in the secure SFFS enablement process. The FFD file 202 and key certificate 203 are stored in the memory 106 prior to a reboot of the SoC 200 in order to start the SFFS enablement process when the reboot occurs. The SFFS interfacing tool 207 or the SFFS website portal 260 receives user inputs 230 selecting a requested set of firmware features to enable and, based on the selection, generates the FFD file 202. The FFD file 202 contains the requested set of firmware features 301 encoded in a format that can be parsed by the secure coprocessor 210. In one embodiment, the requested set of firmware features 301 is hashed and concatenated with a timestamp; this result is then signed with the user's private key. As shown below in Equation 1, the completed FFD file 202 (FFD_File) contains the encoded requested set of firmware features 301 (Req_Feature_Set) concatenated with the signature 302 (Sign (Hash (Req_Feature_Set)|time_stamp)).

$$FFD\_File=Req\_Feature\_Set|Sign(Hash(Req\_Feature\_\\Set)|time\_stamp) \qquad \text{(Equation 1)}$$

The hash function Hash( ) can be an arbitrary hash function, such as Secure Hash Algorithm (SHA), MD5, or other hash function. The signature function Sign( ) can be a signing function such as Rivest-Shamir-Adleman probabilistic signature scheme (RSA-PSS) or other signing function.

The key certificate 203 associates a user entity's entity ID 311 with the user entity's public key 312, and is signed 313 with the monitoring party's private key. In one embodiment, the monitoring party's private key is specific to the model of the SoC 200. As shown in Equation 2, the key certificate 203 contains the entity ID 311 (Entity_ID), user entity's public key 312 (Public_Key), and the signature 313. The signature 313 is generated by hashing the entity ID 311 and the public key 312, then invoking the Sign( ) function on the hash result concatenated with the timestamp.

$$Key\_certificate=Entity\_ID|Public\_Key|Sign(Hash\\(Entity\_ID|Public\_Key)|timestamp) \qquad \text{(Equation 2)}$$

The resulting key certificate 203 associates the user entity's entity ID 311 with the user entity's public key 312, with the association proven by the monitoring party's signature.

Figure 4:
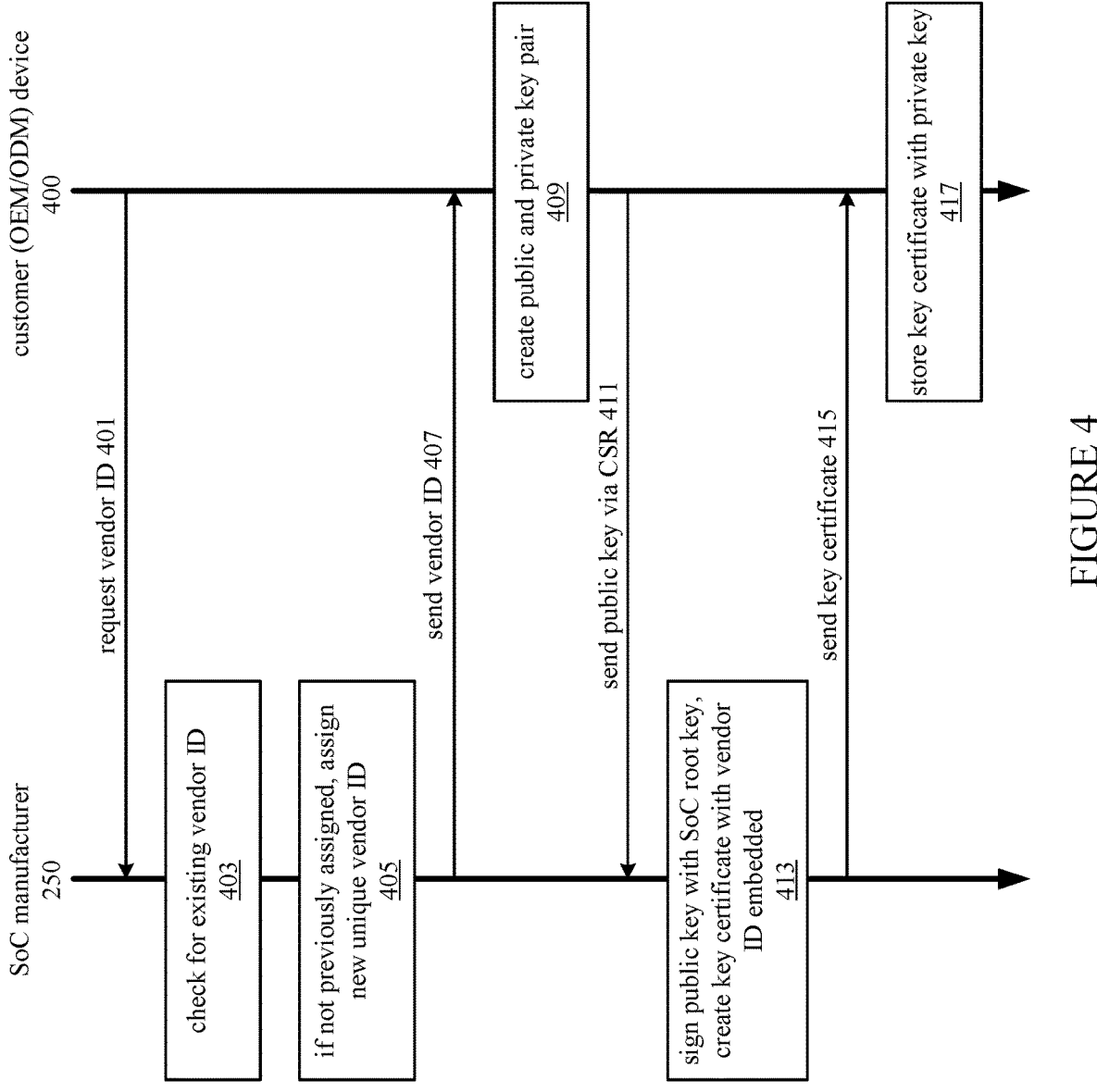
FIG. 4 illustrates a process for assigning an entity identifier and generating a key certificate for a system-on-chip user, according to an embodiment.

FIG. 4 is a network communication diagram illustrating a provisioning process in which a user entity (OEM, ODM, etc.) is assigned an entity ID and a key certificate 203 is generated for the user entity. The process is conducted by a server device 250 owned by the SoC monitoring party and a user entity's device 400, which may be the computing device 100 or another device owned by the user entity. As shown in FIG. 4, the user 400 sends a request 401 to the monitoring server 250 to assign a unique entity ID, which is used to uniquely identify the user entity. The request 401 includes information about the user entity, such as a company or personal name, account number, contact information, etc.

Upon receiving the request 401, the SoC monitoring server 250 checks the entity database 251 to determine whether an existing entity ID was previously assigned to the same user entity, as shown at block 403. If the user entity is already associated with an existing entity ID in the database 251, the monitoring server 250 returns the existing entity ID to the user device 400. Otherwise, if the user entity is not yet associated with an entity ID in the entity database 251, the monitoring party generates a new unique entity ID and assigns it to the user entity by recording an entry in the database 251 that associates the new entity ID with the user entity's information, per block 405. The new entity ID is returned 407 to the user device 400.

The unique entity ID is used to associate further communication with the same user entity and is embedded in a key certificate. After the entity ID is assigned, the key certificate is created. At block 409, the user device 400 creates a public key and private key pair using a cryptographic algorithm such as Rivest-Shamir-Adleman (RSA), Elliptic Curve Cryptography (ECC) or another valid public key infrastructure (PKI) algorithm. The user entity saves the private key, keeping it secret, and transmits the public key via a certificate signing request (CSR) 411 to the monitoring server 250 along with the previously assigned entity ID. The monitoring server 250 receives the CSR 411 and responds by signing the public key using a private root key associated with the SoC model, or another dedicated signing key. The key certificate 203 is thus created, which associates the public key with the entity ID upon the authority of the SoC monitoring party. In one embodiment, the key certificate 203 is in the X.509 format. In alternative embodiments, the key certificate 203 format is not limited to X.509. At block 417, upon receiving the key certificate 203, the user device 400 stores the key certificate 203 for later use in the secure SFFS enablement process. In some embodiments, a model ID is added alongside the entity ID in the key certificate 203. The model ID accommodates scenarios where the user entity uses the same type of SoC device to generate various product models that are identified by different Model IDs.

In addition to the key certificate 203, the SFFS enablement process also uses an FFD file 202, which the user entity obtains using the SFFS website portal 260 or, alternatively, the SFFS interfacing tool 207. The user entity selects system firmware feature sets from the available firmware feature sets supported by the SoC 200 using the website portal 260 or SFFS interfacing tool 207. The website portal 260 is implemented using software executing on a server that generates the FFD file 202 based on inputs 230 received from the user entity via network 240. As an alternative, the user entity may use the interfacing tool 207, which is implemented as software executed in the SoC 200 itself, and generates a firmware feature description (FFD) file in response to the user inputs 230. In alternative embodiments, the interfacing tool 207 is executed on a different computing system owned by the user entity or a third party.

FIG. 5 illustrates a graphical user interface 500 provided by the website portal 260 or the interfacing tool 207 to facilitate the selection of system firmware features. In some embodiments, a graphical user interface is not provided; instead, the selected system firmware feature sets may be indicated via a command line interface, script, batch file, etc. The user provides user inputs 230 to the user interface 500 to select a set of firmware features to enable in the SoC device 200. Each of the listed items in the user interface 500 describes an available system firmware feature set that can be enabled in the SoC device 200. Each system firmware feature set represents a function or a set of functions that are performed or controlled by the system firmware 204.

A user selects an initial set of firmware features for enabling by checking the checkbox adjacent to the description. If the selected feature set depends on one or more prerequisite feature sets to be enabled in order to function, then the user interface responds to the selection by automatically selecting the one or more prerequisite feature sets, and indicating that they are selected by checking their respective checkboxes. For example, if the user selects the firmware anti-rollback (FAR) feature set, then the interface 500 automatically selects the Transparent Memory Encryption (TSME) feature set if it is not already selected. In this case, the FAR feature set depends on the TSME feature set in order to function properly. If the selected feature set is incompatible with any already selected feature set, the user interface 500 deselects the incompatible feature sets, indicating the deselection by unchecking the checkboxes of the deselected feature sets.

After the feature selection is made, the user clicks the "Submit" button, which directs the website portal 260 or interfacing tool 207 to encode the selection into a format that can be parsed by the secure coprocessor 210. This encoded firmware feature set 301 is returned to the user's device in an unsigned FFD file, and the user's device signs the feature set 301 with its previously generated private key to create the signed Firmware Feature Description (FFD) file 202 that will be used in the secure SFFS enablement process. The encoded feature set 301 is hashed, concatenated with a time stamp, and then signed with the user entity's previously generated private key, as previously described, to generate a signature 302. The final signed FFD file 202 includes the requested firmware feature set 301 and the signature 302.

Figure 6:
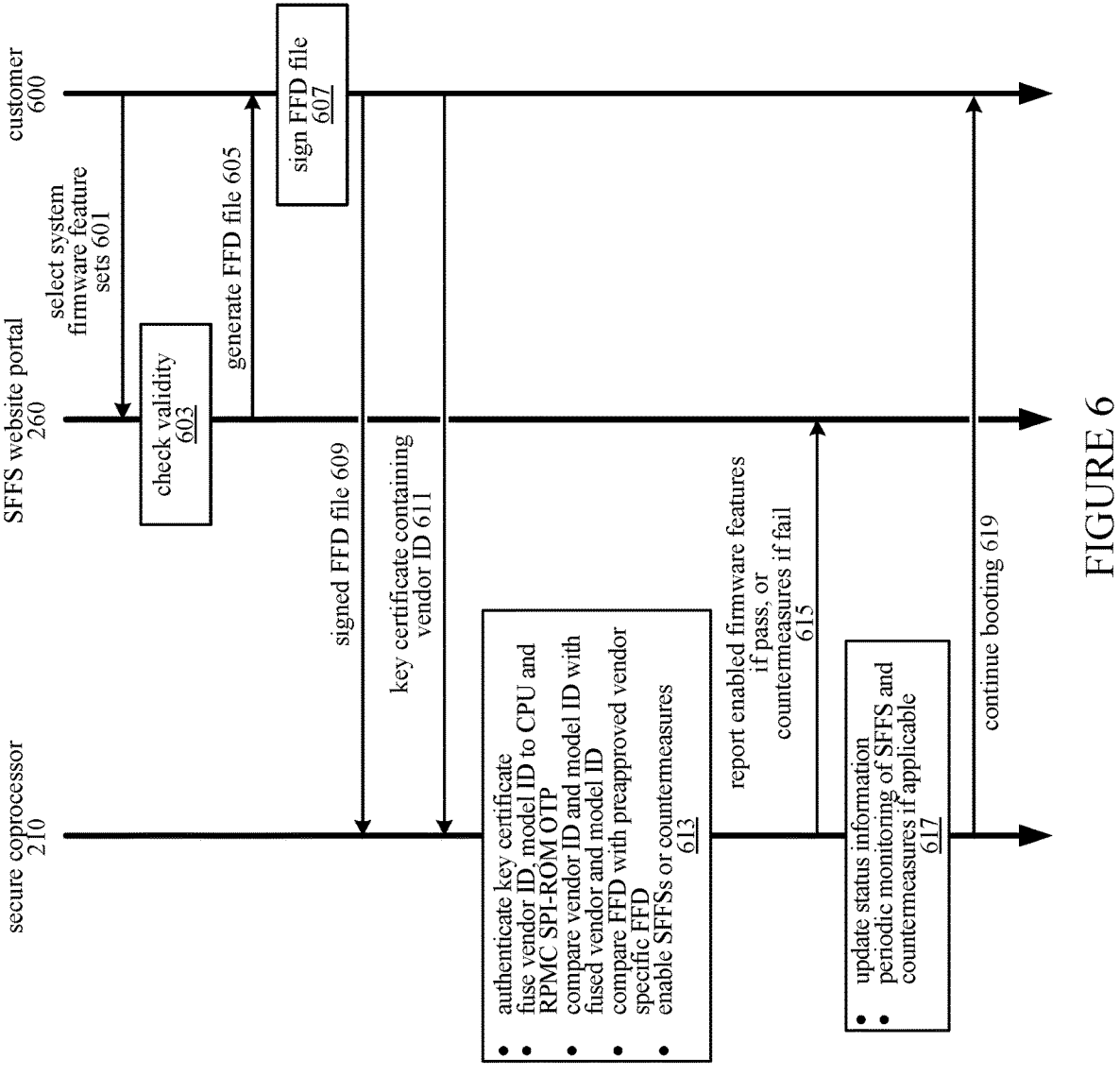
FIG. 6 illustrates a process for securely enabling one or more system firmware feature sets in a computing device, according to an implementation.

FIG. 6 is a network communication diagram illustrating a process for securely enabling SFFS in a SoC device 200, according to an embodiment. The SFFS enablement process is performed by a user entity 600, the SFFS website portal 260 (or alternatively, the SFFS interfacing tool 207), and the secure coprocessor 210 in the SoC 200. The user entity 600 initiates the secure SFFS enablement process by sending a request 601 to select one or more SFFSs for enabling to the website portal 260. At block 603, the website portal 260 checks the validity of the selection. For example, the website portal 260 determines whether the selected firmware feature sets are within the approved feature sets that can be enabled for the user entity, selects any prerequisite firmware feature sets on which the selected feature sets depend, and deselects any features sets that are incompatible with the selected feature sets. In one embodiment, the SFFS interfacing tool 207 is used for obtaining an FFD file instead of the website portal 260. The SFFS interfacing tool 207 functions similar to the website portal 260 but resides in the same integrated circuit package as the other components of SoC 200. Thus, communications directed to the SFFS interfacing tool 207 for obtaining the FFD file and the FFD file itself need not be transmitted over the network 240. At block 605, the website portal 260 or interfacing tool 207 generates an unsigned FFD file and returns it to the user entity 600.

The user entity 600 signs the FFD file at block 607 with its private key, as previously described, then stores the signed FFD file in memory 106 as provided at 609. At 611, the user device also stores the key certificate 203 containing the user entity's entity ID 311 and public key 312 in the memory 106. In one embodiment, the memory 106 includes a Serial Peripheral Interface Read-Only Memory (SPI-ROM) in which the FFD file 202 and key certificate 203 are stored. In alternative embodiments, the FFD file 202 and key certificate 203 are stored in other boot storage media (e.g. embedded Multi-Media Controller (eMMC), Universal Flash Storage (UFS), etc.) that is accessible to the secure coprocessor 210. The FFD file 202 and key certificate 203 can be transferred to the memory 106 by an arbitrary method (e.g., transmitted over a network, copied from Universal Serial Bus flash drive, etc.).

Upon a reboot of the SoC device 200, the secure processor 210 checks the memory 106 and continues the secure SFFS enablement in response to finding the signed FFD file 202 and key certificate 203. As part of the validation process, at block 613, the secure coprocessor 210 loads and authenticates the key certificate 203 using the monitoring party's public key, since the key certificate 203 is signed with the monitoring party's private key. The secure coprocessor 210 further extracts the entity ID 311 and, as part of the validation process, compares the entity ID 311 with the entity ID 222 recorded in the OTP memory 220, if the entity ID 222 was previously recorded. The validation fails if the entity IDs 311 and 222 do not match. In one embodiment, the secure coprocessor 210 performs additional validation by comparing the requested SFFS with a SFFS that was pre-approved for the user entity, failing the validation if the requested SFFS exceeds the preapproved SFFS.

If the validation of the FFD file 202 is successful (i.e., the file 202 is successfully authenticated, entity IDs 311 and 222 match, etc.), then the approved firmware features are enabled by the firmware feature enablement logic 212. At 615, the coprocessor 210 transmits the result of the SFFS enablement process to the website portal 260. This information includes indications of the user entity's entity ID and SoC model number, whether or not the validation was successful, which SFFSs were enabled in the SoC 200, which countermeasures will be in effect, a timestamp, and/or other information about the SFFS enablement process.

At block 617, the secure coprocessor 210 updates status information reflecting the status of system firmware features to a dedicated status register or to a serial log output. If the validation was not successful, then countermeasures are enabled by the countermeasure logic 213. In addition, the monitoring/telemetry logic 214 in the secure coprocessor 210 monitors the operation of the SoC device 200 and transmits information describing the operation of the SoC device 200 to the SoC monitoring server 250. This information informs the SoC monitoring party about, for example, which SFFSs are enabled and whether or not the features are being properly utilized. The monitoring party uses this information to determine whether the user entity did not enable features as expected, or is misusing features. At 619, the secure coprocessor 210 signals other components in the SoC device 200 (e.g., processing unit(s) 104) to continue booting to normal operation with the selected SFFSs now enabled.

Figure 7:
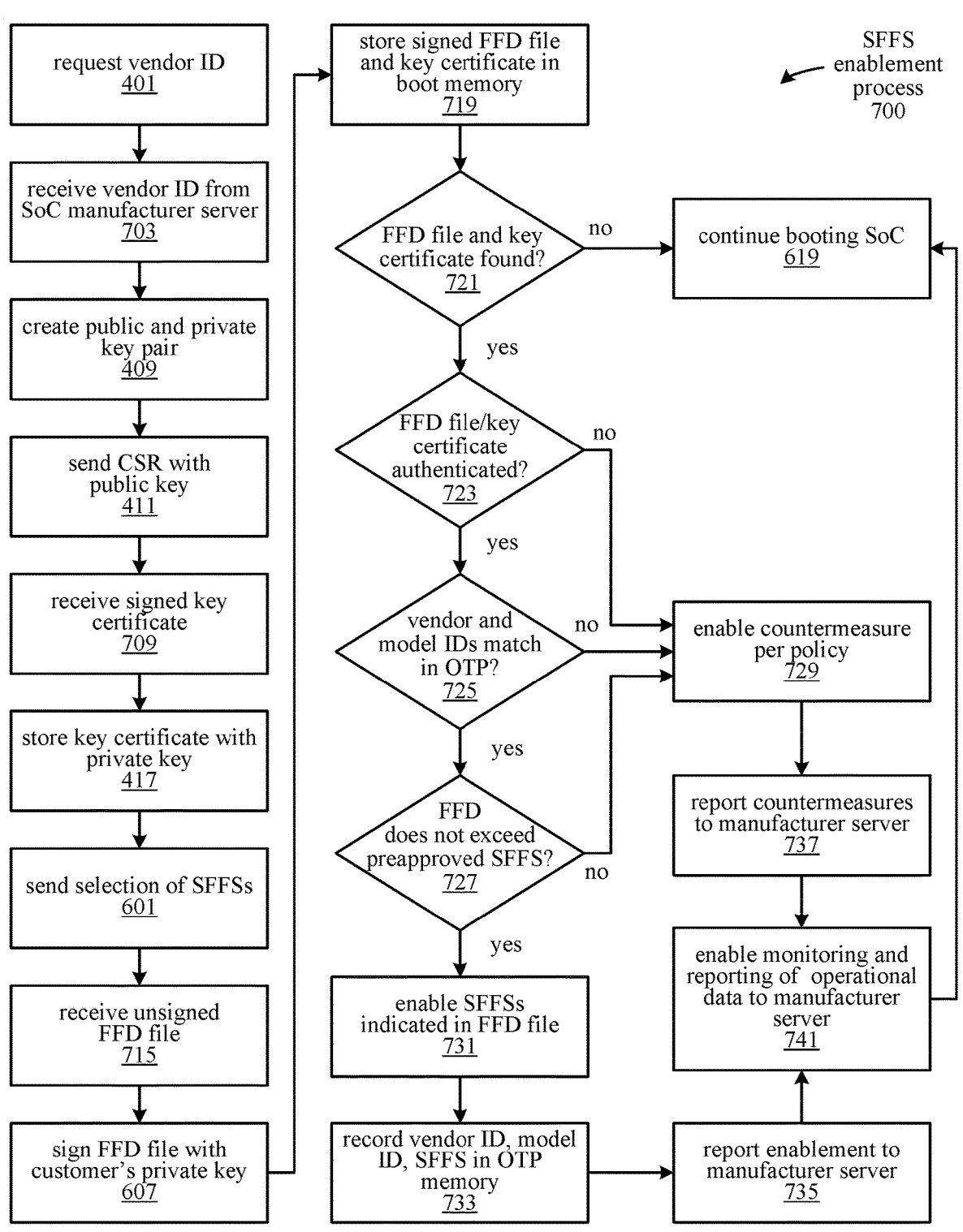
FIG. 7 illustrates a process for securely enabling one or more system firmware feature sets in a computing device, according to an implementation.

FIG. 7 illustrates an embodiment of a SFFS enablement process 700 for enabling one or more selected SFFSs in the system firmware of a SoC device 200. The devices and components illustrated in FIG. 2 participate in the process 700, such as the secure coprocessor 210 and other components of the SoC device 200, the SoC monitoring server 250, etc. Some blocks in the process 700 have reference numbers corresponding to similar operations as illustrated in FIGS. 4 and 6. Blocks 401, 703, 409, 411, 709, 417 of process 700 correspond to the operations illustrated in FIG. 4. The remaining blocks of process 700 correspond to the operations illustrated in FIG. 6.

At block 401, the user entity 600, via the SoC device 200 or another computing device, transmits a request for an entity ID to the SoC monitoring server 250 via the network 240. The monitoring server 250 receives the request and responds by either returning an existing entity ID already associated with the user entity 600, or by creating and returning a new entity ID for the user entity 600 if an entity ID for the user entity 600 does not already exist. At block 703, the user entity 600 receives the entity ID from the monitoring server 250.

At block 409, the user entity 600 creates a public and private key pair, then sends the public key and the entity ID for signing via a certificate signing request (CSR) transmitted to the monitoring server 250, as provided at block 411. The monitoring server 250 acting as a certificate authority responds to the CSR by signing the public key and the entity ID with its private key (e.g., a root key associated with the SoC device model). The monitoring server returns the signed key certificate to the user entity 600. The user entity 600 receives the signed key certificate at block 709 and, at block 417, stores the key certificate with its private key. The key certificate associates the public key with the entity identifier, on the authority of the monitoring server 250. In one embodiment, the above process for assigning an entity ID and generating a key certificate is performed once per user entity, and the entity ID and key certificate are used for securely enabling SFFSs on one or multiple SoC devices. In one embodiment, the key certificate and private key are stored in memory 106 located in the same integrated circuit package (and in some embodiments, on the same integrated circuit substrate) as the components of the secure coprocessor 210 so that the key certificate and private key can be accessed by the secure coprocessor 210 without transmitting their signals off-chip.

Block 601 and the subsequent blocks represent operations performed when securely enabling SFFSs (or attempting to enable SFFSs) in the SoC device 200. The SFFS website portal 260 or the SFFS interfacing tool 207 provide a user interface for selecting SFFSs. In one embodiment, the user interface is presented on a display 105 of the computing device 100, or another computing device operated by the user entity 600. At block 601, the user entity 600 sends an initial selection of SFFSs to be enabled to the SFFS website portal 260 or interfacing tool 207, which automatically selects any prerequisite firmware feature sets in response to determining that the initial selection depends on the prerequisite firmware feature sets. The website portal 260 or interfacing tool 207 also deselects any firmware feature sets that are incompatible with the initial selection. The user entity 600 instructs the website portal 260 or interfacing tool 207 (e.g., by clicking the 'Submit' button) to generate a FFD file indicating the resulting feature selection.

The website portal 260 or interfacing tool 207 returns the unsigned FFD file to the user entity 600. At block 715, the user entity 600 receives the unsigned FFD file. At block 607, the user entity 600 signs the FFD file with the user entity's own private key. At block 719, the user entity 600 requests enablement of the selected SFFSs by storing the signed FFD file 202 and the previously obtained key certificate 203 in memory 106 that is accessible to the secure coprocessor 210 at boot time.

At boot time, the coprocessor 210 checks the memory 106 for the presence of the FFD file 202 and the key certificate 203, as shown at block 721. If the FFD file 202 and key certificate 203 are not present, the process 700 continues at block 619, and the SoC device 200 continues booting normally without performing the secure SFFS enablement. At block 721, if the coprocessor 210 finds the FFD file 202 and key certificate 203 in the memory 106 at boot time, then the SFFS enablement process 700 continues at block 723.

Blocks 723-731 correspond to block 613, as illustrated in FIG. 6. At blocks 723-727, the coprocessor 210 performs a validation process that includes authenticating the FFD file

202 based on the key certificate 203, comparing the entity and model IDs in the FFD file 202 and the OTP memory 220, and determining whether the SFFSs specified in the FFD file 202 for enabling exceed a preapproved set of SFFSs. At block 723, the authentication logic 211 in the secure coprocessor 210 performs an authentication process to confirm that the FFD file 202 was properly signed by the user entity's private key. The key certificate 203 associates the user entity's public key with the user entity's entity ID; thus, the public key is used to confirm that the FFD file 202 was signed using the user entity's private key that corresponds to the public key. In addition, if an entity ID 222 is recorded in the OTP memory 220, the coprocessor 210 determines whether the user entity's entity ID in the key certificate 203 matches the entity ID 222. The coprocessor 210 also determines whether or not the requested SFFS is included in a pre-approved set of firmware features associated with the user entity's entity ID. In one embodiment, the pre-approved set of firmware features 223 is recorded in the OTP memory 220.

If the FFD file 202 and key certificate 203 are successfully authenticated, no mismatch is detected between the entity and model ID in the FFD file 202 and/or key certificate 203 and the recorded entity ID 222 and model ID, and the SFFSs specified in the FFD file 202 do not exceed the pre-approved SFFS, then the process 700 continues from blocks 723-727 to block 731. At block 731, the firmware feature enablement logic 212 in the secure coprocessor 210 enables the selected SFFSs in the system firmware 204. At block 733, in response to successful validation and SFFS enablement, the entity ID 222 and model ID are recorded in the OTP memory 220 residing in the same integrated circuit package as the secure coprocessor 210, if not previously recorded. The OTP memory 220 is also updated to contain a record of the SFFS that was enabled. At block 735, an indication that the SFFS enablement process was successful is reported to the monitoring server 250, along with the SFFS that was successfully enabled.

At block 741, after the enabling of the requested set of firmware features, the monitoring/telemetry logic 213 in the coprocessor 210 is enabled to record operational data from the SoC device 200 and transmit the operational data to the monitoring server 250. The operational data includes information about which of the enabled system firmware features are being used, and how they are being used. This allows the monitoring party to determine if firmware features are not being enabled as expected, or are not being properly used. At the next block 619, the SoC device 200 continues booting to normal operation with the SFFSs now enabled.

Referring back to blocks 723-727, if the FFD file 202 or key certificate 203 are not successfully authenticated (e.g., a mismatch is detected between the public key and the FFD file 202), a mismatch is detected between the entity ID or model ID and a recorded entity ID 222 or model ID in the OTM memory, or the requested SFFS exceeds an approved SFFS, then the coprocessor 210 detects a violation, and the process 700 continues from block 723, 725, or 727 to block 729. At block 729, the authentication logic 211 communicates the violation to the countermeasure logic 213, which responds to the violation by enabling one or more countermeasures. Countermeasures include disabling a cache device, other memory device, and/or processing core of the SoC device 200, limiting a clock frequency (i.e., throttling) of a processing core or other circuit, transmitting an indication of the violation to the monitoring server 250, booting into safe mode, etc. In one embodiment, the countermeasures are enabled according to a policy that determines which countermeasures, if any, are enabled in response to particular types of violations. At block 737, the countermeasure logic 213 in the coprocessor 210 reports which countermeasures were enabled.

From block 737, the process 700 continues at block 741. The monitoring/telemetry logic 213 in the coprocessor 210 is enabled to record operational data from the SoC device 200 and transmit the operational data to the monitoring server 250. The transmitted data informs the monitoring party about operation of the SoC device 200 while the countermeasures are enabled. At the next block 619, the SoC device 200 continues booting to operation with the countermeasures in effect.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing device 100 and/or portions thereof carried on the computer-readable storage medium may be a database or other data structure which can be read by a program and used, directly or indirectly, to fabricate the hardware including the computing device 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing device 100. The netlist may then be placed and routed to produce a data set describing geometric shapes to be applied to masks. The masks may then be used in various semiconductor fabrication steps to produce a semiconductor circuit or circuits corresponding to the computing device 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method, comprising:

performing a validation process on a firmware feature description file indicating a set of firmware features in an integrated circuit package, the validation process including determining that a requested set of firmware features is included in an approved set of firmware features stored in a one-time programmable memory region;

communicating a result of the validation process to a secure processor residing in the integrated circuit package; and selectively enabling the set of firmware features via the secure processor when the result indicates successful validation.

2. The method of claim 1, further comprising generating the firmware feature description file by:

receiving a selection in an interfacing tool of an initial set of firmware features from available firmware features of a processing device, wherein:

the interfacing tool resides in the same integrated circuit package as the secure processor, the initial set of firmware features is included in a requested set of firmware features, and each of the available firmware features is associated with one or more functions of firmware in the processing device; and automatically selecting one or more prerequisite firmware feature sets in the requested set of firmware features in response to determining that the initial set of firmware features is dependent on the one or more prerequisite firmware feature sets.

3. The method of claim 1, wherein:

the validation process is based on a key certificate associating a first entity identifier value with the firmware feature description file; and the method further comprises:

storing the key certificate and the firmware feature description file in a memory device residing in the same integrated circuit package as the secure processor, wherein the key certificate further associates the first entity identifier value with a public key; and recording the first entity identifier value, a model identifier, and the set of firmware features in a one-time programmable memory region residing in the integrated circuit package.

4. The method of claim 1, wherein the one-time programmable memory region resides in the same integrated circuit package as the secure processor and stores a second entity identifier value, and the validation process further comprises:

determining that a first entity identifier value associated with the firmware feature description file matches the second entity identifier value.

5. The method of claim 1, further comprising:

when the result indicates that the firmware feature description file is valid, enabling the set of firmware features for system firmware residing in the integrated circuit package.

6. The method of claim 1, further comprising:

when the result indicates that the firmware feature description file is invalid, communicating an indication of a violation to the secure processor to cause the secure processor to disable one or more of a cache device and a processing core in a processing device.

7. The method of claim 1, further comprising:

detecting a violation during the validation process by detecting a mismatch between a public key and the firmware feature description file, wherein a key certificate stored in the integrated circuit package associates a first entity identifier value with the public key.

8. The method of claim 1, further comprising:

detecting a violation during the validation process in response to a mismatch between a first entity identifier value associated with the firmware feature description file and a second entity identifier value recorded in the one-time programmable memory region.

9. The method of claim 1, further comprising:

detecting a violation during the validation process when the set of firmware features exceeds the approved set of firmware features.

10. A computing device, comprising:

a secure processor residing in an integrated circuit package comprising authentication logic circuitry and configured to:

perform a validation process on a firmware feature description file indicating a set of firmware features, the validation process including determining that a requested set of firmware features is included in an approved set of firmware features stored in a one-time programmable memory region, and selectively enable the set of firmware features when a result of the validation process indicates successful validation.

11. The computing device of claim 10, wherein:

the secure processor further comprises firmware feature enablement logic circuitry configured to, when the result indicates that the firmware feature description file is valid, enable the set of firmware features for system firmware residing in the integrated circuit package.

12. The computing device of claim 10, wherein:

the authentication logic circuitry is further configured to, in response to a violation detected during the validation process, enable a countermeasure in a processing device by communicating an indication of the violation to countermeasure logic circuitry of the secure processor residing in the same integrated circuit package; and the countermeasure logic circuitry is configured to, in response to the indication, disable one or more of a cache device and a processing core in the processing device.

13. The computing device of claim 10, wherein:

the authentication logic circuitry is configured to perform the validation process based on a key certificate associating a first entity identifier value with the firmware feature description file;

the computing device further comprises a memory device residing in the same integrated circuit package as the secure processor and configured to store the key certificate;

the key certificate associates the first entity identifier value with a public key; and the authentication logic circuitry is configured to detect a violation by detecting a mismatch between the public key and the firmware feature description file.

14. The computing device of claim 10, wherein:

the authentication logic circuitry is configured to detect a violation during the validation process in response to a mismatch between a first entity identifier value associated with the firmware feature description file and a second entity identifier value recorded in the one-time programmable memory region, the one-time programmable memory region residing in the same integrated circuit package as the secure processor.

15. The computing device of claim 10, wherein:

the authentication logic circuitry is further configured to detect a violation during the validation process when the set of firmware features exceeds the approved set of firmware features.

16. A computing system, comprising:

a server device configured to generate a key certificate; and a processing device coupled with the server device and comprising a secure processor residing in an integrated circuit package comprising authentication logic circuitry, wherein the secure processor is configured to:

based on the key certificate, perform a validation process on a firmware feature description file indicating a set of firmware features, the validation process including determining that a requested set of firmware features is included in an approved set of firmware features stored in a one-time programmable memory region; and using the authentication logic circuitry, selectively enable the set of firmware features when a result of the validation process indicates successful validation.

17. The computing system of claim 16, wherein:

the secure processor is further configured to, in response to a violation detected during the validation process, communicate an indication of the violation to the server device.

18. The computing system of claim 16, wherein: the server device is further configured to:

in response to receiving an entity identifier request from a user entity, perform a lookup of the user entity in a database, in response to determining that the user entity is not associated with an existing entity identifier in the database, associate the user entity with a new entity identifier in the database, and in response to receiving a certificate signing request including a public key of the user entity, generate the key certificate associating the user entity with the public key by signing the public key using a root key associated with the processing device;

the computing system further comprises a memory device configured to store the key certificate in the same integrated circuit package as the secure processor; and the secure processor is further configured to perform the validation process based on the new entity identifier.

19. The computing device of claim 10, wherein the approved set of firmware features is stored in the one-time programmable memory region prior to delivery of the computing device to a user entity.

20. The computing device of claim 10, wherein the approved set of firmware features indicates a maximum set of firmware features that are available for enabling.

* * * * *